United States Patent
Iskander et al.

(10) Patent No.: US 9,589,068 B2
(45) Date of Patent: Mar. 7, 2017

(54) GRAPH REPRESENTATION OF PROPERTY LOOKUPS

(71) Applicant: Apple Inc., Cupertino, CA (US)

(72) Inventors: Alexis A. Iskander, San Jose, CA (US); Mitchell B. Rivera, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 14/250,302

(22) Filed: Apr. 10, 2014

(65) Prior Publication Data
US 2015/0294026 A1 Oct. 15, 2015

(51) Int. Cl.
*G06F 17/30* (2006.01)

(52) U.S. Cl.
CPC .............. *G06F 17/30958* (2013.01)

(58) Field of Classification Search
CPC ................................ G06F 17/30958
See application file for complete search history.

(56) References Cited

U.S. PATENT DOCUMENTS

| 8,244,775 B1* | 8/2012 | Bak ......................... G06F 8/315 |
| | | 707/756 |
| 2010/0250625 A1* | 9/2010 | Olenick ............ G06F 17/30607 |
| | | 707/810 |

\* cited by examiner

*Primary Examiner* — Grace Park
(74) *Attorney, Agent, or Firm* — Blakely, Sokoloff, Taylor & Zafman LLP

(57) ABSTRACT

An embodiment of an object property management system using a dataflow architecture that expresses an application data as a directed acyclic graph and propagates data through the graph in an ordered, predictable way based on connections between the graph nodes. In one embodiment, the object property management system uses proxy nodes to arrange a dynamic graph for property data propagation for nested properties to allow property relationships to automatically adjust based on changes to a property value within the hierarchy of the property path.

29 Claims, 11 Drawing Sheets

GRAPH REPRESENTATION OF PROPERTY LOOKUPS

BACKGROUND OF THE DISCLOSURE

In Object Oriented Programming, data objects can be defined to have both data elements and methods of behavior. In some programming languages, objects can also have properties, which are an integration of data and method. Properties can be read from or written to like a data element but those reads and writes are translated to an underlying set of methods that are used to access (e.g., get, set, compute, transform, etc.) the property values. The properties can be bound to other properties, such that a change in one property is reflected in a different property.

In some languages, nested properties are supported, in which one property can contain other properties, or can contain an object that can include additional properties. Object property management can quickly become complex in nested property scenarios in which the value of one property can be defined by multiple other properties, such that setting one property can lead to a cascade of changes throughout a set of properties that are dependent upon the changed property. Current object property systems provided by programming languages and application frameworks attempt to manage this complexity via a variety of techniques. However, the current system may not be application dataflow aware, in that the system may not account for the direction and hierarchy of the dataflow within the application as designed by the application or the application developer.

SUMMARY OF THE EMBODIMENTS

In one embodiment, an electronic device comprising one or more processors having one or more processor cores executes instructions stored in memory to provide an object property system. To provide the object property system, the processor receives a property lookup request including a root object and a property path and parses the property path to determine a property to associate with each section of the property path. For each section of the property path, the processor creates a proxy node and couples the proxy node with a graph node of the determined property.

In one embodiment, a data processing system comprising a memory device and a processor is configured to implement the object property system, which includes a root object and a first property of the root object, which has a value defined at least in part by a path of nested properties including a second property, or via the second property via a complex relationship, such as a derived property or complex binding. The path of nested properties can be used to specify a dependency hierarchy for the property nesting in which the second property is based. The first property of the root object can access the value of the second property via at least one proxy node, which couples one or more of a downstream node and an upstream node of the respective properties, and automatically adjusts the node arrangements.

In one embodiment, a computer-implemented method is implemented at a proxy node of an object property system. The method comprises receiving a notice at the proxy node of a change in a value of a property within the property path, automatically disconnecting the proxy node from an associated property in the property path in response to receiving the notice, and performing a property lookup to retrieve a set of graph nodes for a new property, wherein the set of retrieved graph nodes for the new property includes an upstream graph node and a downstream graph node. The method further includes coupling with the upstream node in the set of retrieved graph nodes when the proxy node is configured as an upstream proxy node, and coupling with the downstream node in the set of retrieved graph nodes when the proxy node is configured as a downstream node proxy node.

The above summary does not include an exhaustive list of all aspects of the embodiments. It is contemplated that the embodiments include all systems and methods that can be practiced from all suitable combinations of the various aspects summarized above, and also those disclosed in the detailed description below.

BRIEF DESCRIPTION OF THE DRAWINGS

The accompanying drawings are provided to illustrate the various embodiments. The following description and drawings are intended to be illustrative of the embodiments and are not to be construed as limiting. Reference to "one embodiment" or "an embodiment" means that a particular feature, structure, or characteristic described in conjunction with the embodiment can be included in at least one embodiment. The appearance of the phrase "in one embodiment" in various places in the specification do not necessarily refer to the same embodiment.

In the figures of the accompanying drawings in which like references indicate similar elements, and in which.

Other features will be apparent from the drawings listed above, and from the detailed description, which follows.

DETAILED DESCRIPTION

An embodiment of the object property management system can be implemented using a dataflow architecture that expresses an application's data (e.g., properties, bindings, and data transformations) as a directed acyclic graph. Data propagates through the graph in an ordered and predictable way based on the connections between the graph nodes.

Redundant or cyclical updates to property bindings and observers are avoided by defining an "upstream" data flow and a "downstream" data flow for object properties. To facilitate the data flow, each instance of an object property can have one or both of an upstream node and a downstream node. Each node can have any number of parent or child nodes.

In one embodiment, upstream and downstream imply a relative authority, where a first property or property instance, is bound upstream of a second property, the first property is considered more authoritative than the second property. When a property is to be changed, the upstream node of the property sends a request upstream towards the truth instance to request a change in the authoritative value of the property. If the truth instance accepts the request and updates the truth, a notification of the update is sent through a chain of downstream nodes for each bound property.

Additional information on the use of upstream and downstream nodes within the property system can be found in co-pending application Ser. No. 14/162,688 filed on Jan. 23, 2014, which is incorporated herein by reference.

Example Objects and Properties

Figure 1:
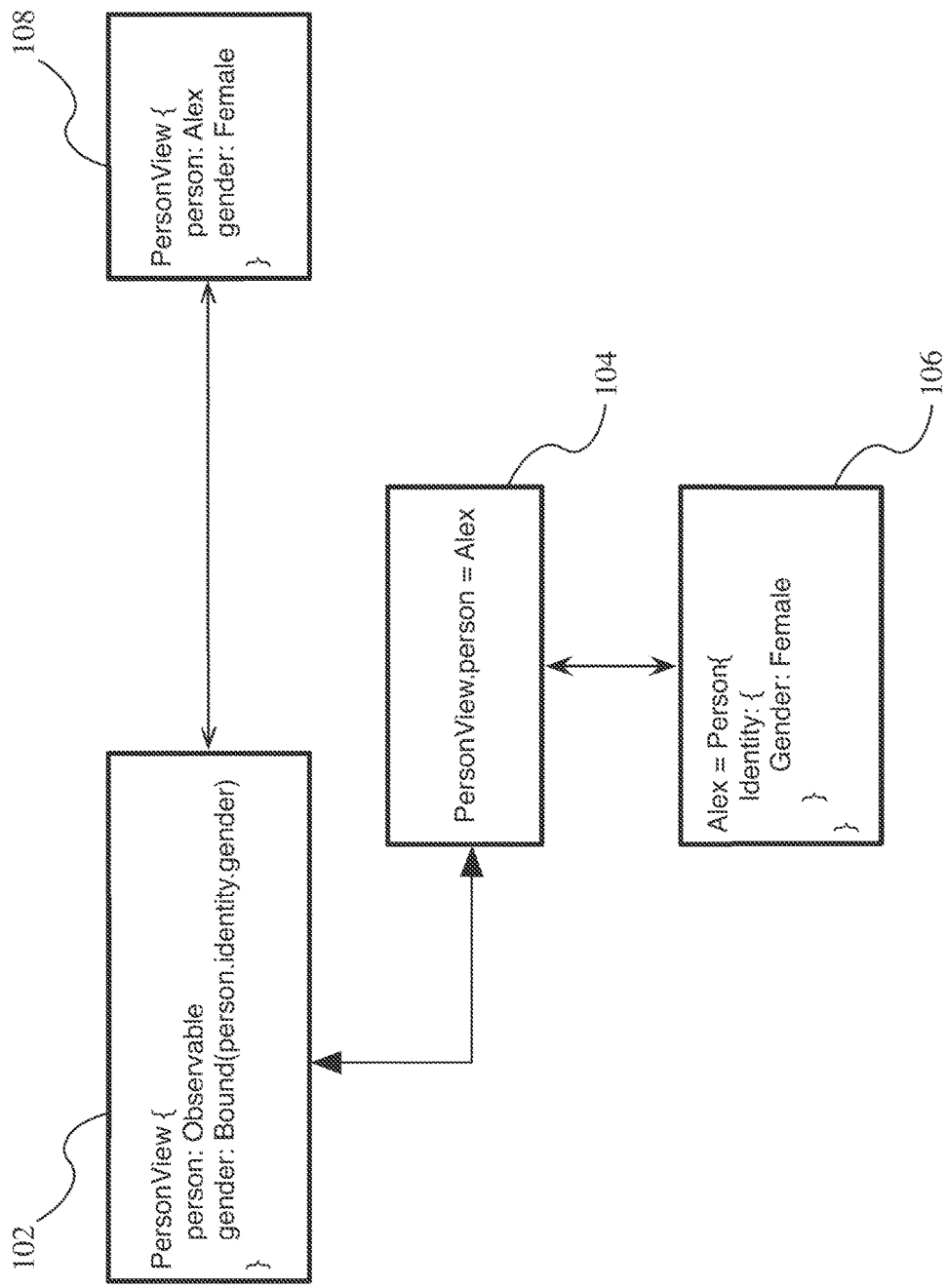
FIG. 1 shows a block diagram illustrating an exemplary object property system with nested properties.

FIG. 1 shows a block diagram illustrating an exemplary object property system with nested properties. The object property system can be used, for example, in the implementation of a graphical interface for an application executing on a data processing system. An exemplary view object (e.g., PersonView) is shown at block 102. The exemplary view object has an observable property (e.g., PersonView.person) and a bound property (e.g., PersonView.gender). The Person property has a nested property (e.g., Identity), which, in turn, also has a nested property (e.g., Gender).

An exemplary property binding is shown between PersonView.gender and the current instance of the property defined by the 'person.identity.gender' property path. The value of the PersonView.gender property reflects the value of the identity.gender property of the assigned Person data structure. An exemplary assignment is illustrated at block 104 in which the person property of PersonView is currently assigned to the value "Alex." Alex is defined as a data structure having an identity.gender value of Female, as shown at block 106. After the assignment shown at block 104, which can occur, for example, in response to the selection of a value in the user interface for the web based application, an exemplary query of the PersonView.person object returns the values defined by the Alex data structure, as shown at block 108.

Graph Nodes, Nested Properties, and Object+Key Lookups

Figure 2:
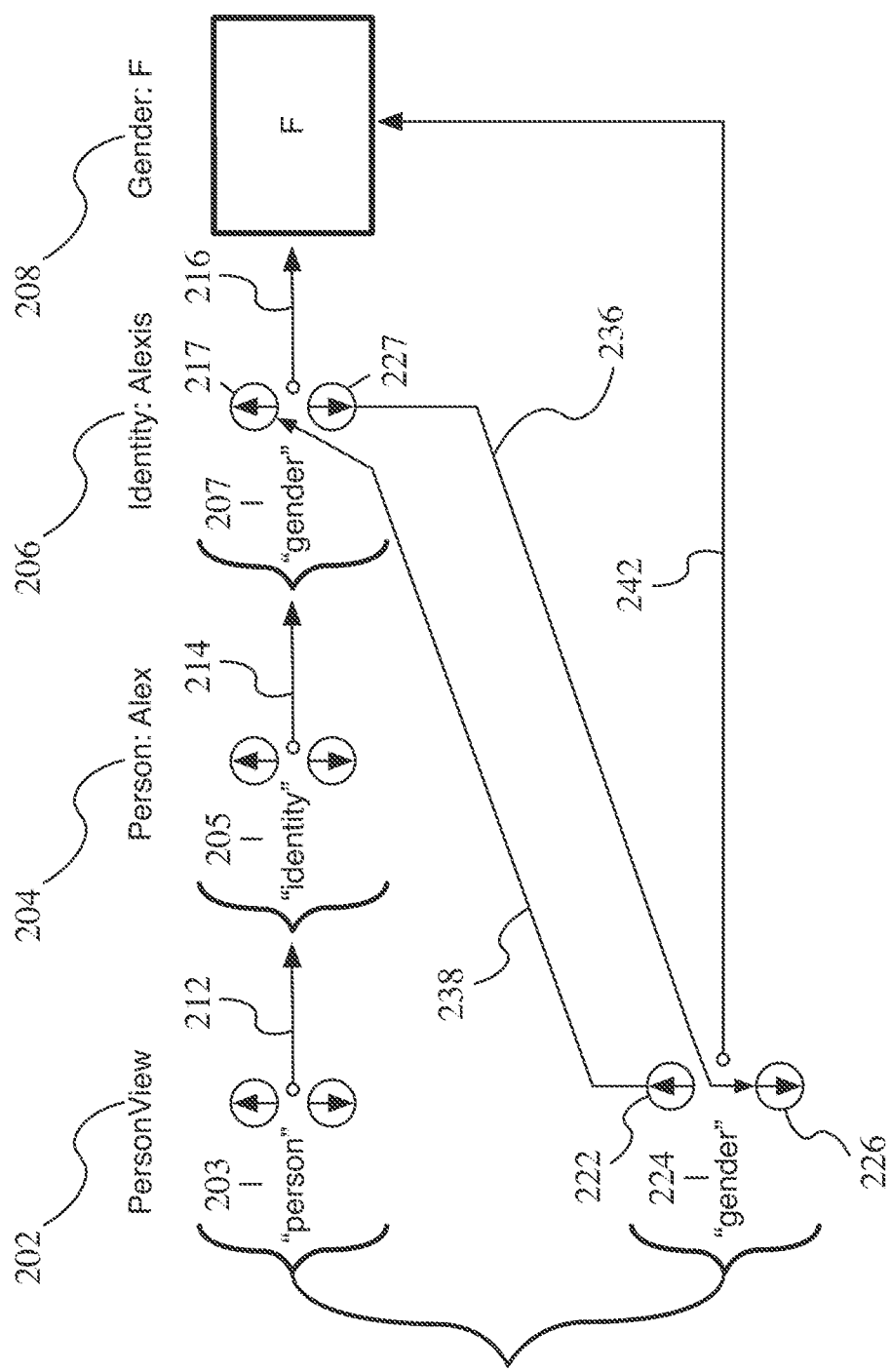
FIG. 2 shows an illustration of the graph node connections used for bindings and observers, according to an embodiment.

FIG. 2 shows an illustration of the node connections used for property binding and observation, in one embodiment, using and object and key lookup. In the exemplary illustration, each instance of a property has an upstream node and a downstream node. To create a binding relationship, an embodiment couples the upstream node of a first property in a graph to the upstream node of a second property. The downstream node of the second property can be coupled in a separate graph to the downstream node of the first property. In one embodiment, an observer can be created using only a downstream node, which is coupled downstream from the observed property. Additionally, other property relationships are possible.

The illustrated objects and properties will be described based upon the exemplary assignments shown in FIG. 1. The PersonView object 202 object is shown, including the person property 203 of the PersonView object 202. As illustrated, the person property 203 is a data structure that is linked via a pointer 212 to a Person instance 204 (e.g., Alex), which is an instance of the person property 203. The person property 203 includes a nested identity property 205. The illustrated Person instance 204 is linked via a pointer 214 to an Identity instance 206 (e.g., Alexis). The Identity instance 206 includes a gender property 207, which is assigned a Female value 208, or a pointer 216 to the value 208.

The exemplary illustration of FIG. 2 shows a binding between the PersonView.gender property 224 and the Alexis.gender property 207. To create the binding, the property system performs a lookup to retrieve the upstream node 217 and downstream node 227 of the Alexis.gender property 207, and the upstream node 222 and downstream node 226 of PersonView.gender 224. For simple (e.g., non-nested) property lookups, the property system can use an object and key lookup within a dictionary that maps property names to their respective upstream and downstream nodes. For example, a dictionary lookup of the Alexis.gender property 207 using the Alexis instance 206 can be performed to retrieve the upstream node 217 and downstream node 227 for the property instance. Once the nodes are retrieved, the system can create a property binding between the PersonView.gender property 224 and the Alexis.gender property 207 by creating an upstream graph edge 238 and a downstream graph edge 236. The binding associates the PersonView.gender property 224 to the value 208, or a pointer 242 to the value 208 of the Alexis.gender property 207.

In the exemplary illustration of FIG. 2, the PersonView.gender property 224 is 'downstream' from the Alexis.gender property 207, indicating that Alexis.gender has more authority in the binding relationship, and is closer to the 'true' value of the binding. The PersonView.gender property 224 can send requests via the upstream node 222 and receive notifications via the downstream node 226. However, the graph arrangement shown is not intended to be limiting, as the precise connections as to the upstream and downstream nodes can vary. For example, the upstream node 222 can also couple as a child of upstream node 217, and downstream node 227 can also couple as a parent of downstream node 226.

A nested lookup can be performed using a property path instead of the individual property instances. Performing a lookup using a property path utilizes a root object, and a property path to a nested property. Using the example of FIG. 1, a path lookup can be performed using PersonView as the root object, and 'Person.identity.gender' as the property path. Such lookup would return the graph nodes for whichever instance (if any) is reachable in the current property configuration. However, should a change occur to any of the properties in the property chain above the target property, the graph could become invalid, such that the binding would no longer be correct.

For example, if PersonView.person is assigned a new value, the nodes previously returned from the path lookup may continue to reflect the property state at the time nodes were initially retrieved. To maintain validity after a change to one or more of the properties in a link of nested properties, the nodes returned from a previous nested lookup would have to be manually updated by the program logic that uses the bindings (e.g., the binding consumer). If the binding consumer is required to manage these updates manually, the application using the bindings may become defect prone and difficult to maintain. Additionally, the performance of the host data processing system may suffer due to increased system resource overhead.

Nested Property Lookups Using Proxy Nodes

An embodiment of the property system described herein enables the automatic management of property observer and bindings for nested property systems via the use of 'proxy' nodes and the use of chained lookups using a property path. The property path is representation of a list of properties that is used to create relationships between properties. The property path has a base property from which other properties in the property path depend, and a target property that depends upon the other properties in the property path.

To facilitate the dynamic nature of a property path lookup, a set of proxy nodes is returned from a path lookup instead of the set of actual graph nodes associated with the property.

In one embodiment, each proxy node automatically manages the respective graph connections of the node in response to any changes in the state of properties along the property path. A binding consumer can use the proxy nodes as the consumer would use the original nodes, while avoiding the need for manual node maintenance when a property in a nested property relationship changes. The proxy nodes are automatically created by the proper during a property lookup for a nested property using a property path. Each proxy nodes manages graph connections such that the proxy node appears identical to the actual node for the respective property based on the state of the property nesting.

In one embodiment the property system provides a reference counting feature, which tracks the number of connections to each node. The proxy nodes can use their reference counts to perform automatic management of their system resources. For example, once a proxy node is connected to the graph, the node and can be configured to self-delete when it no longer used.

Figure 3:
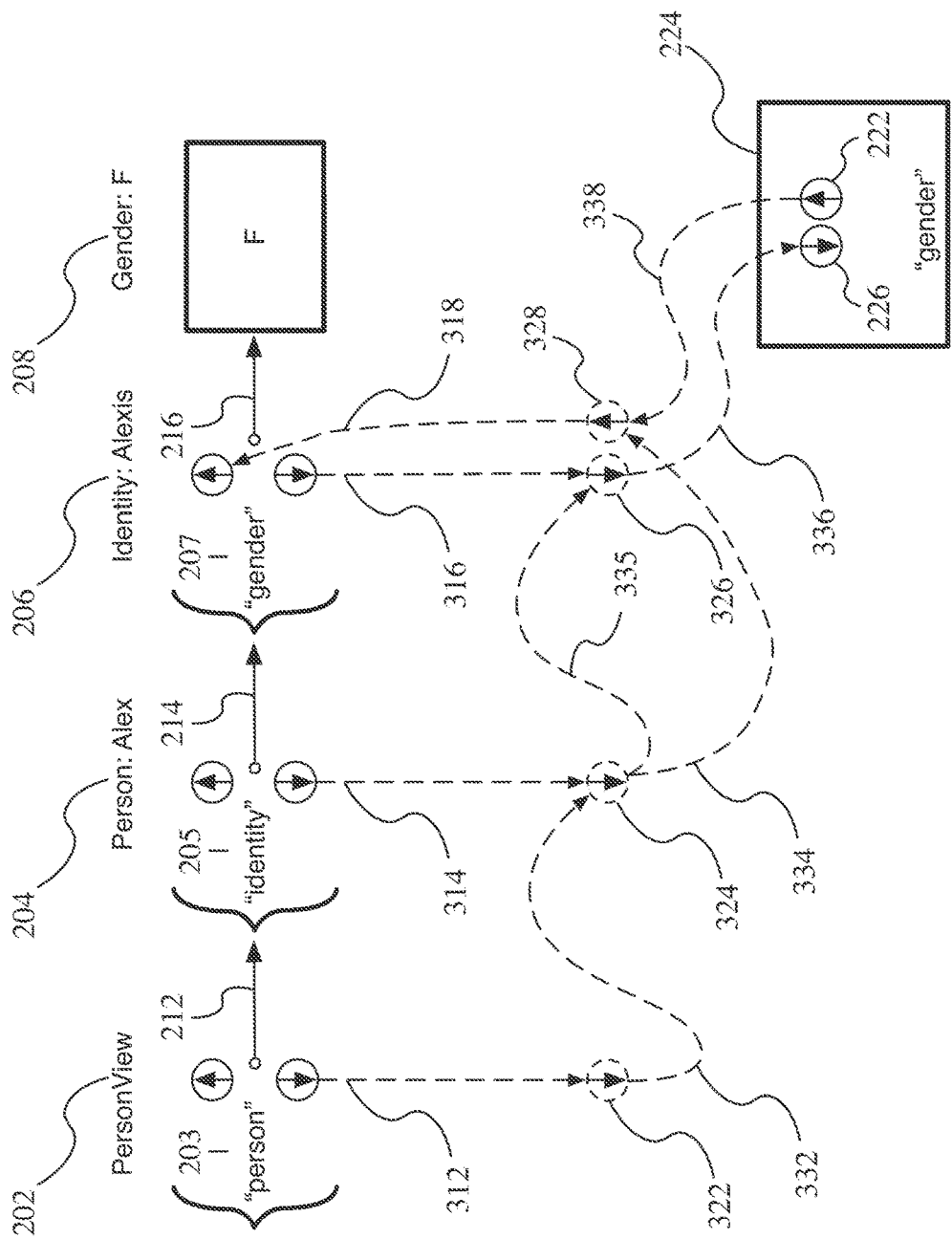
FIG. 3 shows an illustration of graph node connections using proxy nodes, according to an embodiment.

FIG. 3 shows an illustration of the nodes and connections using proxy nodes with a nested property path, according to an embodiment. Instead of explicitly returning the graph nodes of a nested property as in the object and key lookup shown FIG. 2, the property system can create a set of proxy nodes (e.g., 322, 324, 326, 328) to facilitate data flow. The PersonView object 202, and the Person instance 204, Identity instance 206, and associated properties, (e.g., 203, 205, 207) are illustrated in the same configuration as shown in FIG. 2. The binding between the PersonView.gender property 224 and the Alexis.gender property 207 is facilitated by a proxy upstream node 328 and a proxy downstream node 326. At least one proxy node is created for each section of the path. For example, an observer or binding that is created using the property path 'person.identity.gender' can trigger the creation of at least three proxy nodes, one each for person (e.g., proxy node 322), person.identity (e.g., proxy node 324), and person.identity.gender (e.g., proxy node 326).

In one embodiment, three downstream proxy nodes are created when creating an observer for a property referenced by the illustrated path. In one embodiment, an additional upstream proxy node can be created (e.g., proxy node 328), for example, during the creation of a two-way binding. The last proxy nodes in the chain (e.g., 326, 328) are the 'terminal' proxy nodes. The terminal proxy nodes can be configured to couple to the graph nodes of whatever property is targeted by the property that resolves from the property path, and to automatically re-couple to a different property in response to a change in the property path. The upstream proxy node that is created for two-way bindings can also be considered a terminal proxy node. In the exemplary illustration, the 'PersonView.person.identity.gender' property path resolves to the identity.gender property 207 of the Alexis instance 206 of the Identity property. If the value PersonView.person is changed to select a different person, the proxy nodes can be automatically reconfigured to connect to the graph nodes of the new PersonView.person.identity.gender.

At the time of creation for the illustrated binding, a link 312 from the base property (e.g., person property 203 of the PersonView object 202) to the root proxy node 322 can be created, along with a link 332 to the second proxy node 324, and the links 334, 335 to couple the second proxy node 324 to the upstream and downstream terminal proxy nodes. The link 312 between the base property and the root proxy node 324 enables data flow to the root proxy node 322, which allows the node to receive the update notice that is used to react to a change in the value of the person property 203. The root proxy node 324 may not require a recouple in response to the change notification, as the value of the base property may change, but the associated nodes are not likely to change.

The link 332 between the root proxy node 322 and the second proxy node 324 allows the root proxy node 322 to notify the second proxy node 324 of a change to the base property. The second proxy node 324 can respond by decoupling a link 314 from the currently connected nodes of the previously associated property and creating a new link to the nodes of the new property. The second proxy node 324 can propagate the notification along a link 334 to the downstream terminal proxy node 326 and a link 335 to the upstream terminal proxy nodes 328, which can each respond by decoupling their respective links (e.g., 316, 318). The terminal proxy nodes can then reconfigure the node connections to link to the nodes of the new target property.

In one embodiment, the consumer of the binding for the PersonView.gender property 224 uses the proxy nodes returned by an object and path lookup in the same way as the actual graph nodes returned by an object and key lookup. Accordingly, the upstream graph edge 338 can be used in the same manner as upstream graph edge 238 of FIG. 2, and downstream graph edge 336 can be used in the same manner as downstream graph edge 236. It will be noted that the binding hierarchy (e.g., parent/child relationship) between the PersonView.gender property 224 and the root proxy nodes 326, 328 is not limited to the configuration shown.

Exemplary Sequence and Logic Diagrams

The processes depicted in the figures that follow are performed by processing logic that comprises hardware (e.g. circuitry, dedicated logic, etc.), or a combination of hardware and software. The software can be embodied as instructions on a non-transitory machine-readable storage medium for execution by processing hardware. Although the processes are described below in terms of some sequential operations, it should be appreciated that some of the operations described can be performed in a different order. Moreover, some operations can be performed in parallel rather than sequentially.

Figure 4:
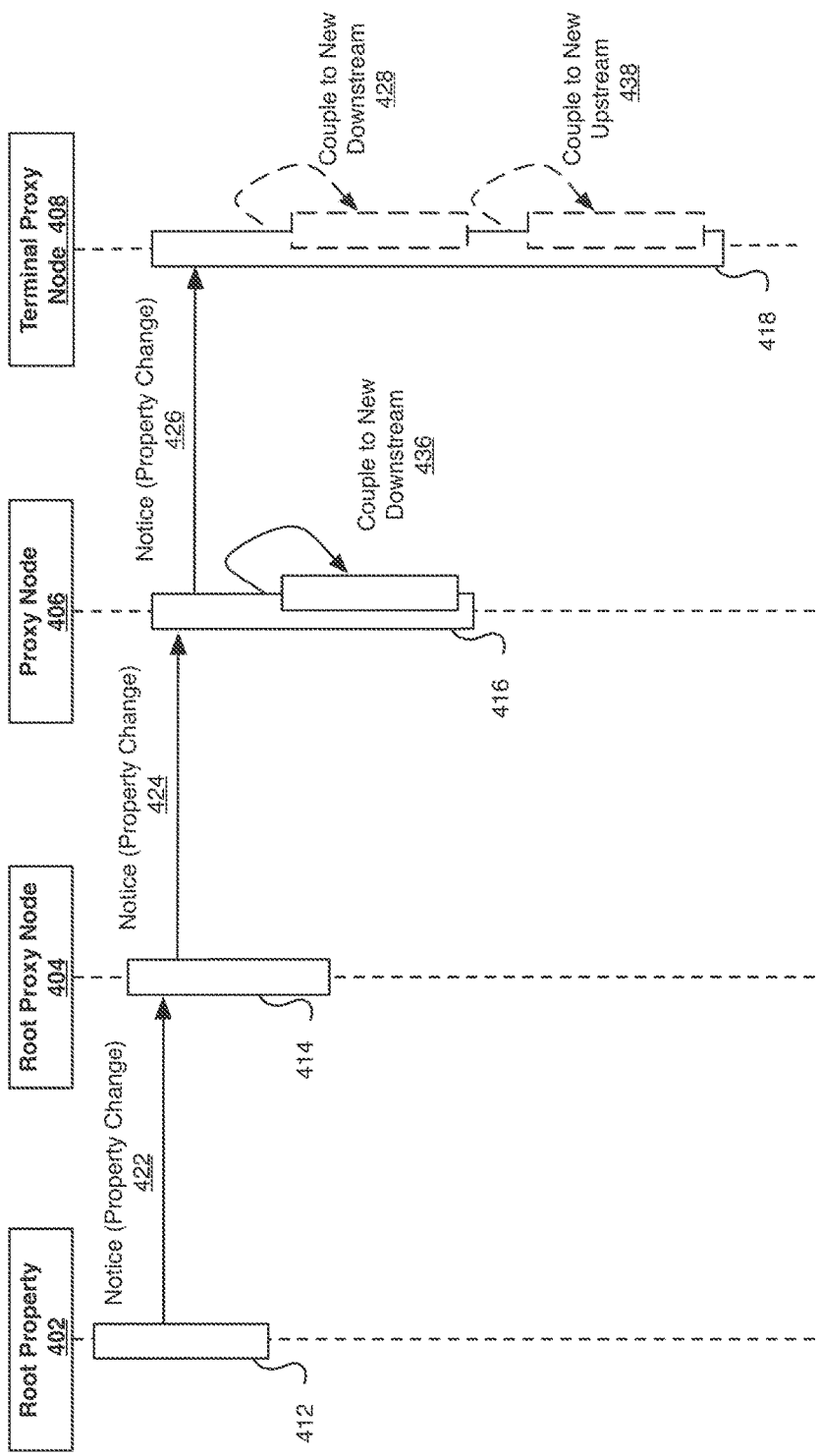
FIG. 4 shows an exemplary sequence diagram of message propagation through the graph nodes during a property change.

FIG. 4 shows a sequence diagram of exemplary message propagation through the graph nodes during a property change, according to an embodiment. A root property 402 of a property path, a root proxy node 404, a non-terminal proxy node 406, and a terminal proxy node 408 are shown. In one embodiment, the root property 402 is a property of a root object in a property path (e.g., person property 203 of the PersonView object 202). Logic 412, such as logic incorporated in the downstream node of the root property 402, can be configured to send a notice 422 in response to any change in the value of the root property 402.

In one embodiment, the root proxy node 404 includes logic 414, which receives the notice 422. In one embodiment, each proxy node, including the root proxy node 404, can be configured to automatically propagate any incoming notice to the other proxy nodes. In one embodiment, the root proxy node 404 inspects the root property 402 to determine if the new value of the property differs from the previous value and only transmits the notice 424 if the new value of the property is different.

A change to the value of the root property 402 is not likely to result in a change in the node structure for the root proxy node 404. However, the other proxy nodes may have to reconfigure. As illustrated, the second proxy node 406, in response to the property change notice 424, disconnects from the downstream node of its assigned property in the chain and performs a lookup for the nodes of the new property. In one embodiment, the new property value is included in the notice 424. The second proxy node 406 can use logic 416 to perform a property lookup to acquire at least the downstream node of the associated property. Having acquired the downstream node of the new property, the logic 416 can perform operation 436 to couple to the new downstream node.

One embodiment of the terminal proxy node 408 includes logic 418 that can vary based on the configuration of the node, as the terminal proxy node 408 can be configured as an upstream node or a downstream node. For observer objects, only a downstream node is required, and the logic 418 of the terminal proxy node 408 can be configured to respond to a notice 426 by performing an operation 428 that includes disconnecting from the existing node, retrieving a new downstream node that is associated with the new property to observe, and coupling to the new downstream node. For a property binding, a first instance of the terminal proxy node 408 is configured as a downstream node and a second instance of the terminal proxy node can be configured as an upstream node. As an upstream node, the logic 418 of the terminal proxy node can be configured to perform an operation 438 that includes coupling to the new downstream node.

Figure 5:
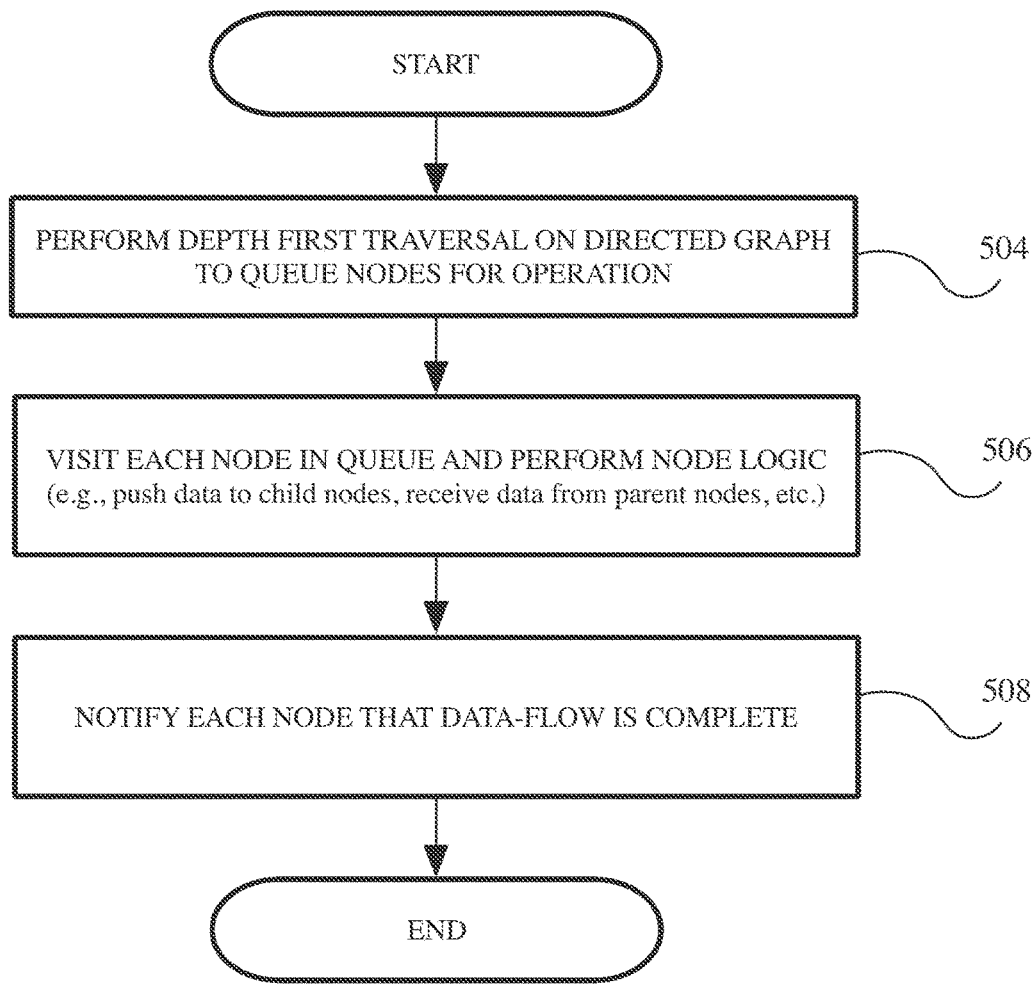
FIG. 5 shows a flow diagram of logic used on a directed graph for object property management, according to an embodiment.

FIG. 5 shows a flow diagram of logic used on a directed graph for object property management, according to an embodiment. The graph operations include a queuing stage, a flushing stage, and a notification stage. The queuing stage determines the order in which each graph node is visited. The queuing stage of an embodiment is shown at block 504, where the order is determined by a depth-first traversal on the directed graph to queue nodes for operation. In one embodiment, the node ordering is determined via a reverse dependency analysis, in which a depth-first traversal is performed on the graph and nodes are added to the front of the queue during a reverse graph traversal. A single node can be added to the queue at most once, and node duplication is not allowed within the queue.

The flushing stage of an embodiment is shown at block 506, which visits each graph node and instructs the graph to perform the logic of each respective node. In general, each node is configured to push data onto their child nodes. An upstream node is configured to push requests upstream to each child node, while a downstream node is configured to push responses and notifications downstream to each child node. In one embodiment, the proxy nodes are configured to listen for change notifications from their parent node, which is either the downstream node of the property node which the node proxies, or from the proxy node of the previous path section. If value of the previous proxy node in the chain has changed, the proxy node can disconnect from old node, connect to new node, if any new node exists, and retrieve the value of the node. In one embodiment, if the value of the property that the proxy node is a proxy for changes, the proxy node simply propagates the change notice.

The notifying stage of one embodiment is shown at block 508. During the notify stage, each node is visited to notify the node that the data flow is complete. Having notice that the data flow has completed, the logic of each node can perform certain final operations. For example, a parent node can dynamically allocate data structures for use during the flush stage to relay information to child nodes. During the notify stage, the parent node can free those resources. In one embodiment, the node order for the notify stage can be performed in reverse of the node order of the flush stage, to allow child nodes to use those data structures during notify stage operations. In one embodiment, a proxy node can query a reference count during the notify stage and automatically free allocated resources and self-delete once the node is no longer used.

Figure 6:
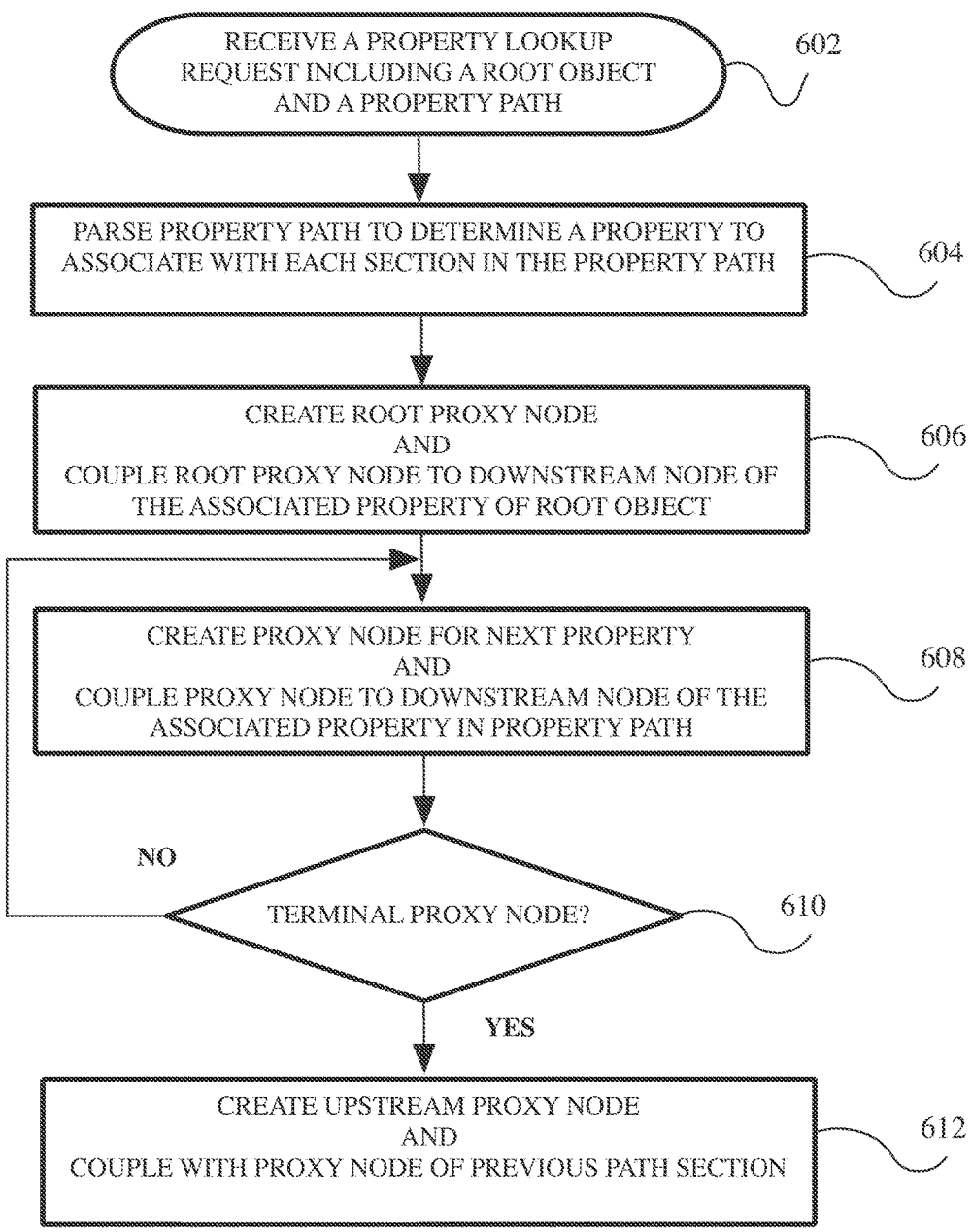
FIG. 6 shows a flow diagram of logic used to create a set of proxy nodes for a property path, according to an embodiment.

FIG. 6 shows a flow diagram of logic used to create a set of proxy nodes for a property path, according to an embodiment. In one embodiment, the proxy node creation logic begins when the object property management system receives a chained property lookup request including a root object and a property path, as shown at block 602. After receiving the request, the system can parse the property path to determine a property to associate each section in the property path, as shown at block 604. The properties for each path are determined based on the current arrangement of the objects and properties when the property path is received.

For the root property (e.g., the property at the root object), the system can create a root proxy node and couple the root proxy node to a downstream node of the associated property of root object, which is shown at block 606. In one embodiment, a proxy node is created for each path section. As shown at block 608, an embodiment creates a proxy node for the next property and couples the proxy node to the downstream node of the associated property in property path. The system can determine, as shown at block 610, whether the last created proxy node is a terminal proxy node. If the last created proxy node is not a terminal node, the system returns to block 608 to create an additional node for the next property path section.

When the system reaches the end of the property path and the last created node is a terminal proxy node, as determined at block 610, the system can determine whether to create an upstream proxy node. For observers, which simply monitor a property for notice that the property has changed, an upstream node may not be required. For a property binding, in particular, a two-way property binding, an embodiment of the system proceeds to block 612, where the system creates an upstream proxy node and then couples the upstream proxy node with the proxy node of previous section of property path. Before coupling a proxy node to the associated property, as shown at block 606, 608, and 612, an embodiment can perform a lookup (e.g., object and key lookup) on the property to retrieve the relevant graph nodes for the respective properties.

Figure 7:
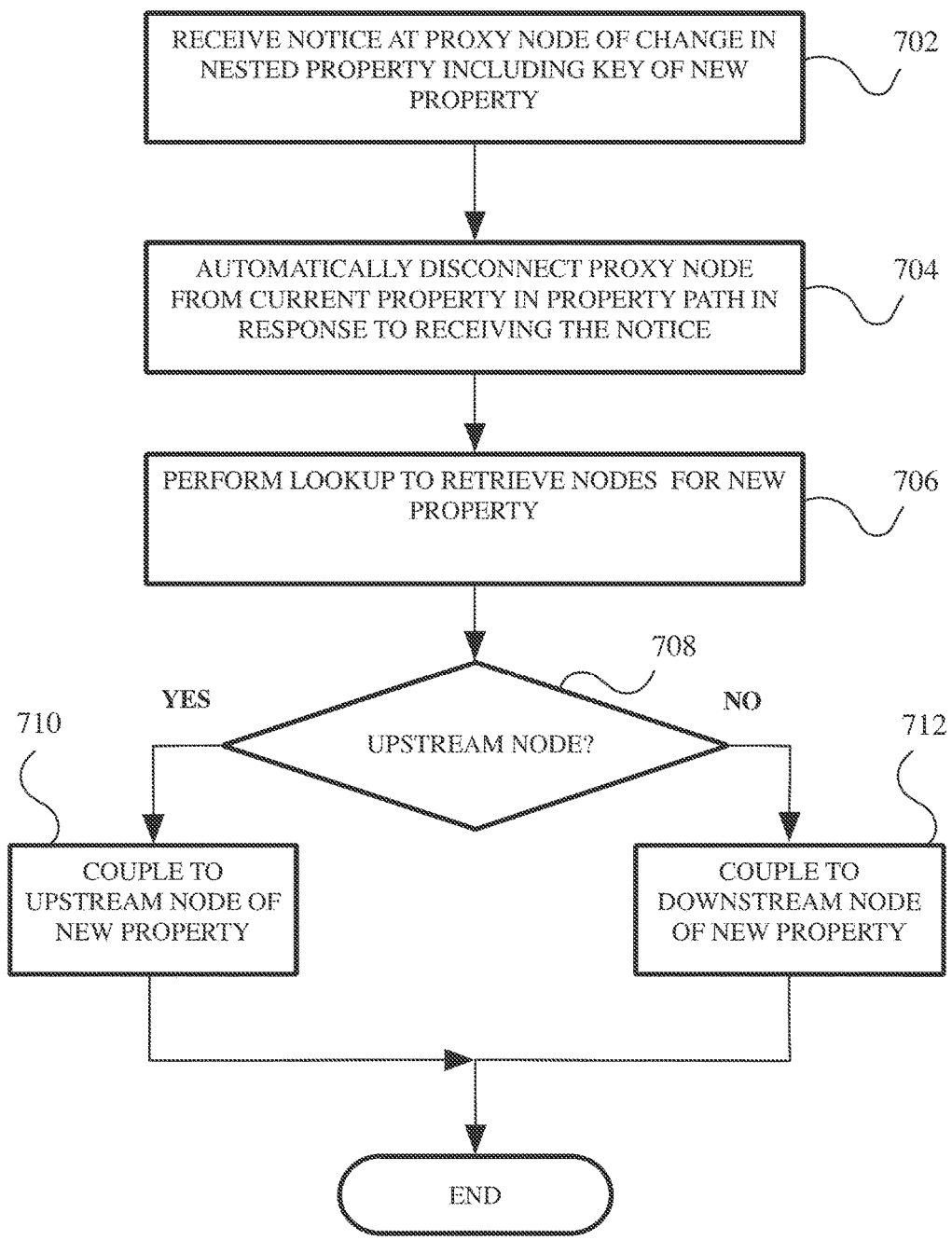
FIG. 7 shows a flow diagram of logic used by a proxy node to manage node coupling, according to an embodiment.

FIG. 7 shows a flow diagram of logic used by a proxy node to manage node coupling, according to an embodiment. In one embodiment, each proxy node includes logic to manage the proxy node couplings with the properties in the property path that defines, for example, a binding, observer, or other property arrangement for a set of objects. In one embodiment, the logic flow begins when a proxy node receives notice of a change in the value of a nested property, as shown at block 702. An embodiment, the notice can include the key identifying the new property. The property nodes can receive a change notice from their associated properties, and that change notice would be propagated to each dependent proxy node. For example, a root property may not change, but a second property in a property path can receive a new value, which will impact each property section that depends on the change property. In response to the notice received at block 702, the system can, as shown at block 704, automatically disconnect from the currently associated property in the property path. As shown at block 706, the proxy node can then perform a lookup to retrieve nodes for new property.

In one embodiment, each proxy node is configured as a downstream node by default. However, proxy nodes can be upstream nodes. At block 708, the proxy node logic determines whether the proxy node is configured as an upstream node. If the proxy node is an upstream node, the node performs the logic indicated at block 710, and couples to the upstream node of the new property. If the proxy node is a downstream node, as determined at block 708, the logic proceeds to block 712, where the node couples to the downstream node of the new property.

Exemplary Software and Hardware Architectures

An embodiment of the object property management system as described herein can be implemented within an application development framework that facilitates the observation and binding of nested properties. For example, an embodiment of the system can be implemented as one of the application or system frameworks illustrated in the exemplary software architecture of FIG. 8. An embodiment can also be implemented as an application framework used in network or web-based applications, as in the exemplary software architecture of FIG. 9. The system can also be performed on one of the exemplary data processing systems shown in FIG. 10 and FIG. 11.

During application development, a software developer can make use of an operating system vendor provided application framework that includes a set of application programming interfaces (API) that enable the developer's application to make use of services provided by the vendor's operating system to user applications. The application framework can be one of any number of application frameworks designed to provide application developers with toolkits and software libraries to access specific functionality provided by a service provider. For example, the application framework can be a user interface framework, such as the Application Kit framework or the UI Kit framework, each provided by Apple Inc. of Cupertino Calif., which provide objects with which developers can implement a graphical, event-driven user interface. The application framework can also be a data services framework that facilitates, in one embodiment, synchronous cloud base storage across multiple devices using, for example, iCloud storage, also provided by Apple Inc.

Figure 8:
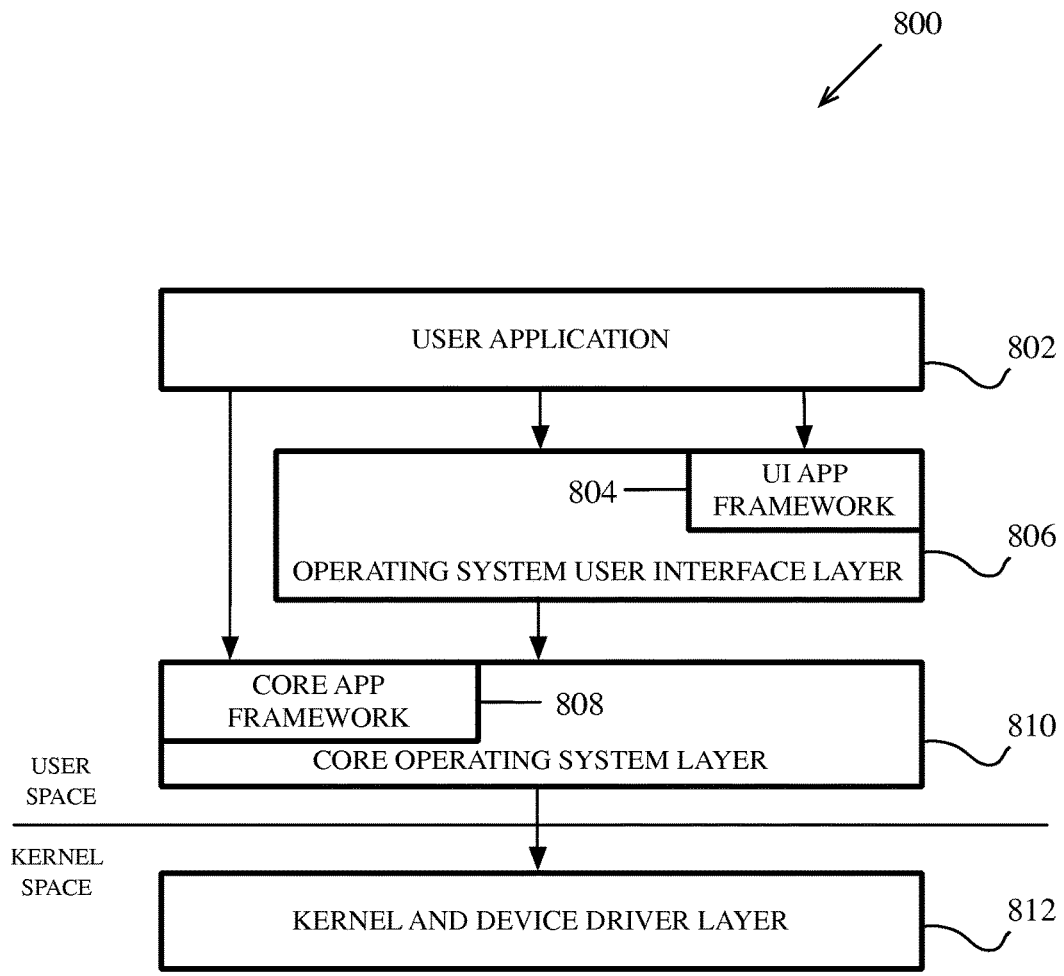
FIG. 8 shows a software architecture including a set of exemplary application frameworks.

FIG. 8 shows a software architecture including a set of exemplary application frameworks that can make use of an embodiment of application dataflow aware object property management. The various software components of the exemplary software architecture 800 can be stored in a combination of volatile and non-volatile memory during the execution of the software components. When the components are not being executed, the components are stored in non-volatile storage such as a magnetic hard drive or semiconductor memory (e.g., flash, etc.).

The software components are illustrated with a division between user space and a kernel space. Although other arrangements are possible, user applications (e.g., user application 802), and some operating system components (e.g., operating system user interface layer 806, and core operating system layer 810) execute in user space. In kernel space, the operating system kernel and a set of device drivers operate in the kernel and device driver layer 812. The kernel and device driver layer 812 manage the underlying functionality of the operating system and provide a formalized and secure mechanism for user space software to access data processing system hardware.

A user interface (UI) application framework 804 provides a mechanism for the user application 802 to access UI services provided by the operating system (OS) UI layer 806. Underlying operating system functions that are not related to the user interface are performed in the core operating system layer 810. One or more data management frameworks, such as a core app framework 808 can be made available to a user application to facilitate access to operating system functions.

The exemplary user application 802 may be any one of a plurality of user applications, such as a web browser, a document viewer, a picture viewer, a movie player, a word processing or text editing application, an email application, or other applications known in the art. The user application 802 accesses instructions in an exemplary UI app framework 804 for creating and drawing user interface objects, such as buttons, windows, dialogs, controls, menus, and other user interface elements and components as are known in the art. The UI application framework 804 also provides additional functionality including menu management, window management, and document management, as well as file open and save dialogs and copy-and-paste handling. The exemplary UI app framework 804 implements an embodiment of the application dataflow aware property and binding system described herein to enhance the efficiency of dataflow among the various property bindings used during execution of instructions provided by the framework.

The core operating system layer 810 contains operating system components that implement features including and related to application security, system configuration, graphics and media hardware acceleration, and directory services. Multiple application frameworks, including the core app framework 808, provide a set of APIs to enable a user application 802 to access core services that are essential to the application, but are not directly related to the user interface of the application. The core app framework 808 can facilitate an application's access to database services, credential and security services, backup services, data synchronization services, and other underlying functionality that may be useful to an application.

For example, using a core app framework 808, an application can provide functionality that allows a user application to automatically synchronize application content between multiple client devices. The core app framework 808, or equivalent application frameworks, can provide access to remote server based storage for functionality including synchronized document storage, key-value storage, and database services. Document storage synchronization allows a user application 802 to access a common data store containing user-visible file-based content from multiple devices. Key-value storage allows a user application 802 to share small amounts of data such as user preferences or bookmarks among multiple instances of the user application 802 across multiple client devices. The user application 802 can also access server-based, multi-device database solutions via the core app framework 808.

Figure 9:
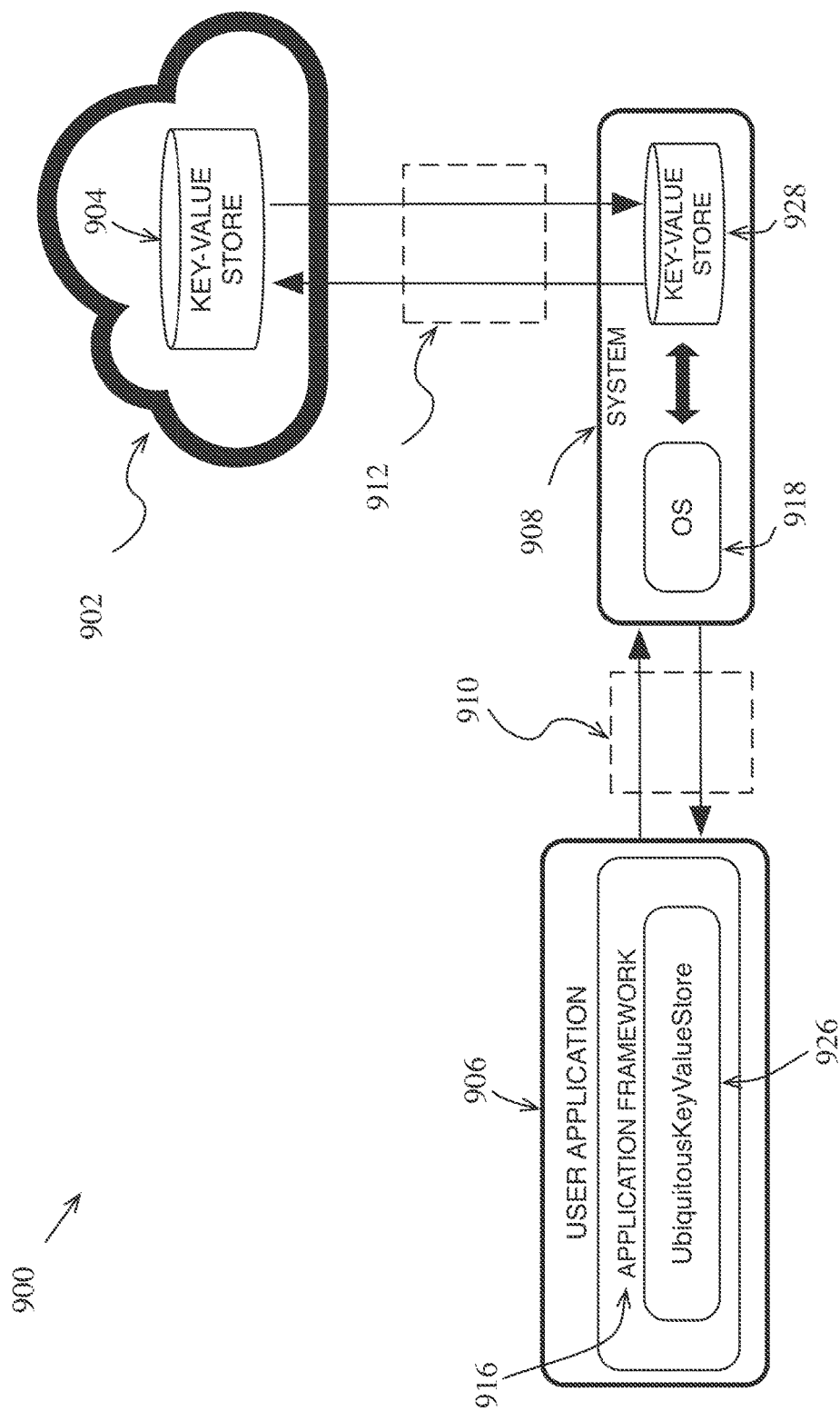
FIG. 9 shows a software architecture including an additional exemplary application framework.

FIG. 9 illustrates software architecture including an exemplary application framework that can make use of an embodiment of the application dataflow aware property and binding system for remote data synchronization. The exemplary software architecture 900 includes a user application 906 developed using an application framework 916 that enables the synchronization of properties using a ubiquitous key value store 926. The user application 906 executes on a data processing system 908, which includes an operating system 918 and a local key-value store 928. In one embodiment, the local key-value store 928 of the data processing system 908 is synchronously bound with a cloud based distributed file storage system 902 that stores a remote version of the key-value store 904, although an asynchronous binding is also possible. Properties used by the user application 906, may be stored in the ubiquitous key-value store 926, which is persistent across multiple instances of the user application 906 when executing on multiple client devices. Requests and notifications can be passed via message channel 910 and message channel 912, which each can be one of several local or remote message passing mechanisms for software communication and synchronization.

The dataflow of the synchronization for the ubiquitous key value store 926 can be performed using one or more embodiments of application dataflow aware property and binding as described herein. A first instance of a property can be stored in the ubiquitous key-value store 926, which is managed by the user application 906, a second instance of the property can be stored in the key-value store 928 of the data processing system 908, which is managed by the operating system 918, and a third instance of the property can be stored in the remote key-value store 904 on a distributed storage system. Each instance of the property is bound to another instance of the property. Each instance includes an upstream node to send requests to set, change, or update the property, and a downstream node to receive notifications of property changes.

In the exemplary software architecture 900, the path of the property binding dataflow is defined based on which of the instances of the property is designated the most authoritative instance for the property. In one embodiment, the most authoritative instance is considered the "truth," and is designated as the key-value store 928 of the data processing system 908. In such embodiment, a change to the property at the user application 906 can trigger the transmission of a request to change the value of the property over a message channel 910, via the upstream node of the instance. The instance of the property at the key-value store 928 of the data processing system 908 receives the request and, in one embodiment, validates the request based on a set of validation conditions (e.g., data range, data type, etc.) before setting the truth to the requested value. Subsequently, a notification including the new value is transmitted via the downstream node of the property at the key-value store 928 over message channel 910 and message channel 912. After receiving the notification via their respective downstream nodes, the value stored at the remote key-value store 904, and the value reflected in the ubiquitous key-value store 926 provided to the user application 906 via the application framework 916 is changed to the new value.

Alternatively, an embodiment may designate the key-value store 904 of the remote storage system 902 as the truth. In such embodiment, when a request that is received at the upstream node of the property stored in the key-value store 928, the instance propagates the request to the key-value store 904 of the remote storage 902 over message channel 912. Additionally, a notification of the truth received at the downstream node of the instance of the property stored in the key-value store 928 can be propagated to the instance of the property used by the user application 906 over message channel 910.

Although the application aware property and binding system is described in conjunction with the exemplary software architectures illustrated, it will be understood that the methods and systems described will have broad application to data binding and synchronization on data processing systems.

Figure 10:
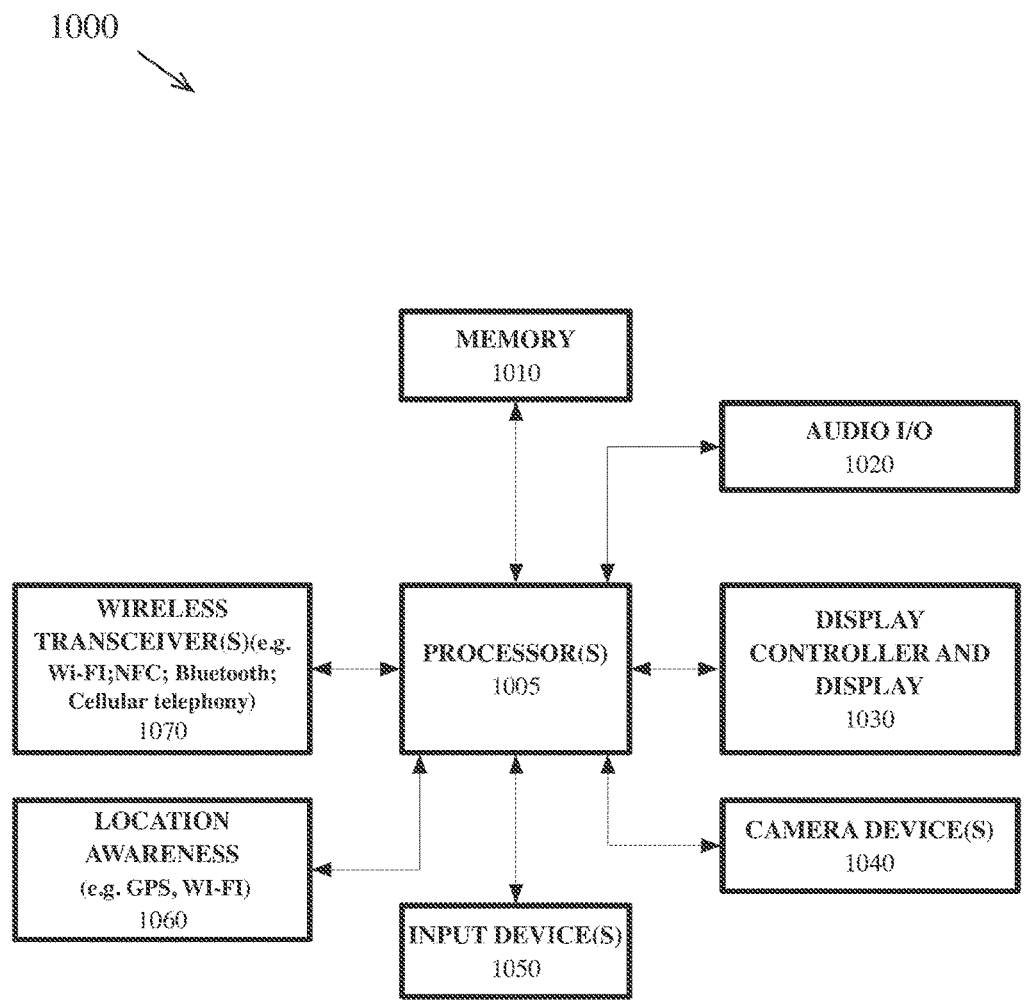
FIG. 10 is a block diagram illustrating an exemplary data processing system used in an electronic device, according to an embodiment.

FIG. 10 is a block diagram illustrating a data processing system 1000 that can be used in an electronic device, according to an embodiment. The exemplary data processing system illustrated can be any handheld or mobile computing device, such as a variant of the iPhone, iPad, or iPod Touch device, all from Apple Inc. of Cupertino, Calif. The data processing system 1000 includes a processing system 1005 with one or more microprocessors. The system 1000 also includes memory 1010 for storing data and programs for execution by the processing system. The system 1000 additionally includes an audio input/output subsystem 1020 that may include a microphone and a speaker for playing back music or providing telephone functionality through the speaker and microphone.

A display controller and display device 1030 can be used to provide a graphical user interface as discussed herein. Additionally, a wireless transceiver 1070 may be available to transmit and receive data via one or more wireless technologies, such as Wi-Fi, infrared, Bluetooth, or one or more variants of wireless cellular technology. One embodiment of system 1000 contains one or more camera devices 1040 configured in both a front and rear facing configuration, though similarly configured systems each with a front facing camera can be one of many optimal configurations. The data processing system 1000 can also include one or more input devices 1050 that allow a user to provide input to the system. Input devices can include a keypad or keyboard, alone or in conjunction with a touch or multi touch panel that is overlaid on the display device 1030. Additionally, embodiments of the data processing system 1000 can also include a device for providing location awareness services, such as a Global Positioning System (GPS) device 1060 or its equivalent.

It is to be noted that the data processing system 1000 as represented in FIG. 10 is by way of example. One or more buses or interfaces, which are not shown, can be used to interconnect the various components, as is well known in the art. As well, additional components, not shown, may also be part of the system 1000 in certain embodiments. In certain embodiments, fewer components than shown may also be used.

Figure 11:
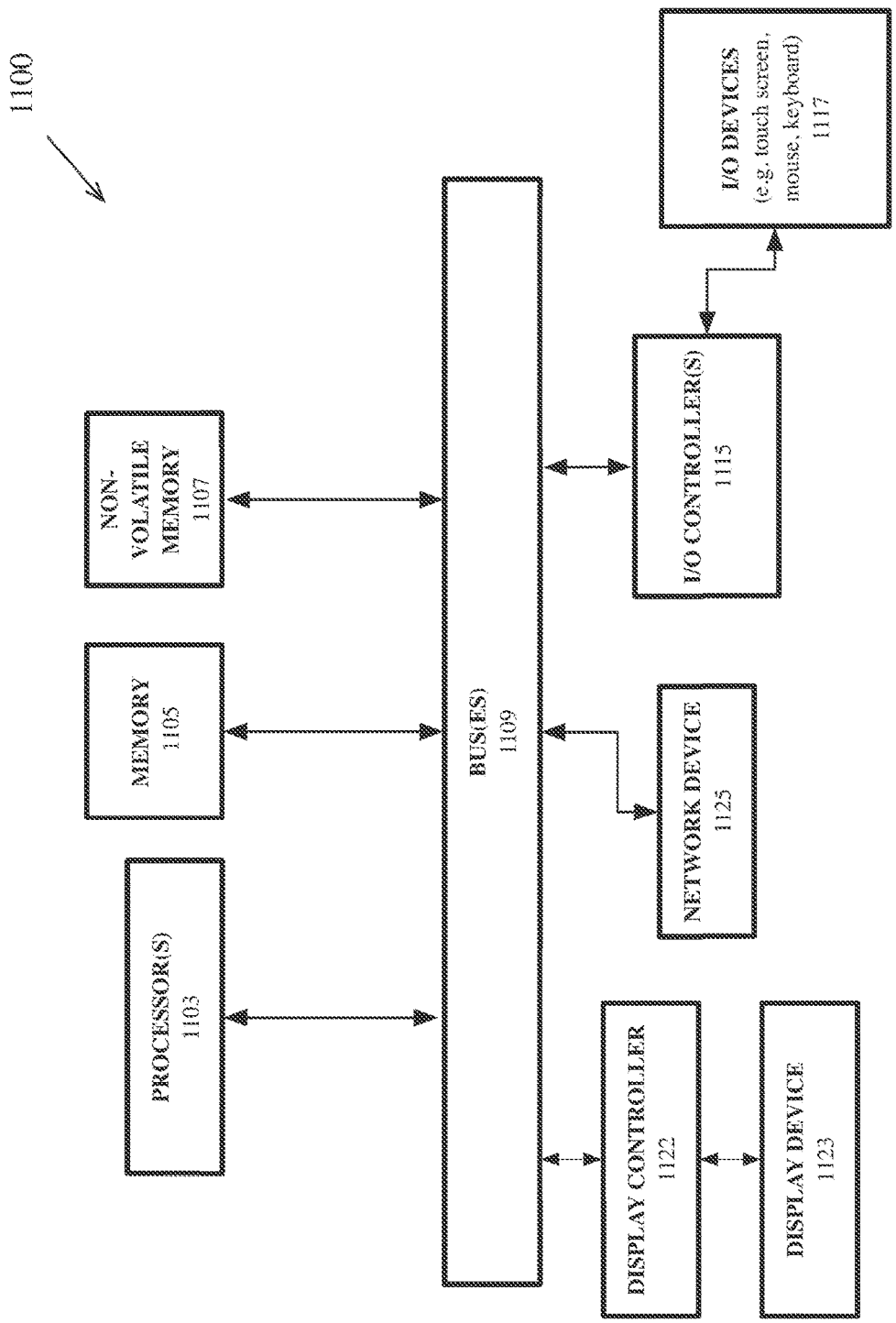
FIG. 11 is a block diagram illustrating an additional data processing system according to an embodiment.

FIG. 11 is a block diagram illustrating an additional data processing system, according to an embodiment. The exemplary data processing system illustrated can be any electronic data processing system, including a Macintosh computer such as a Mac Pro, iMac, or MacBook all from Apple Inc. of Cupertino, Calif. While FIG. 11 illustrates the various components of a data processing system, it is not intended to represent any particular architecture or manner of interconnecting the components as such details are not germane to the embodiments described. The data processing system 1100 includes one or more buses 1109, which serve to interconnect the various components of the system. One or more processors 1103, each containing one or more processor cores, are coupled to the one or more buses 1109 as is known in the art. Memory 1105 may be volatile Sequential DRAM, nonvolatile RAM or may be flash memory or other types of semiconductor memory. The memory 1105 is coupled to the one or more buses 1109 using techniques known in the art.

The data processing system 1100 can also include non-volatile storage memory 1107 which may be a hard disk drive, flash memory, optical memory, other types of memory systems that maintain data after all power is removed from the system. The nonvolatile memory 1107 and the memory 1105 can both couple to the one or more buses 1109 using known interfaces and connection techniques. A display controller 1122 is coupled to the one or more buses 1109 in order to receive display data to be displayed on a display device 1123 which can display any one of the user interface features or embodiments described herein. The display device 1123 can include an integrated touch input to provide a touch screen. The data processing system 1100 can also include one or more input/output (I/O) controllers 1115, which provide interfaces for one or more I/O devices such as one or more mice, touch screens, touch pads, joysticks, and other input devices including those known in the art. The I/O controller can also provide interfaces for one or more output devices (e.g., speakers). The input/output devices 1117 are coupled through one or more I/O controllers 1115 as is known in the art. Additionally, one or more network interfaces 1125 can also be coupled to the one or more buses to provide access to one or more networks.

While FIG. 11 shows that the nonvolatile memory 1107 and the memory 1105 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 1109 may include one or more bridges or controllers or adapters to interconnect between various buses. In one embodiment, the I/O controller 1115 includes a USB adapter for controlling USB peripherals and can control an Ethernet port or a wireless transceiver or combination of wireless transceivers.

The techniques and methods described herein may be carried out in a data processing system in response to its processor executing a sequence of instructions contained in a volatile, non-transitory memory such as the memory 1105 or the non-volatile memory 1107 or a combination of such memories. In various embodiments, hardwired circuitry may be used in combination with software instructions, thus the techniques are not limited to any specific combination of hardware circuitry and software or to any particular source for the instructions executed by the data processing system.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry. Thus, the techniques are not limited to any specific combination of hardware circuitry and software, or to any particular source for the instructions executed by the data processing system associated an apparatus for performing one or more of the operations described herein.

As described herein, if it is said that an element "A" is coupled to or with element "B," element A can be directly coupled to element B or be indirectly coupled through, for example, element C. When the specification or claims state that a component, feature, structure, process, or characteristic A "triggers," or "causes" a component, feature, structure, process, or characteristic B, it means that "A" is at least a partial cause of "B" but that there also can be at least one other component, feature, structure, process, or characteristic that assists in causing "B." If the specification or claim refers to "a" or "an" element, this does not mean there is only one of the described elements.

In one embodiment, the system described herein represents a classical property graph consisting of normal properties and a mix of two-way and one-way bindings. The classical property graph can be implicit in nature, where the implicit graph is represented explicitly as a directed acyclic graph made up of nodes which each perform some action. In one embodiment, triggering a node triggers all of the child nodes of the triggered node. Each child node is triggered through to the leaf nodes of the graph. Where a node is considered a truth node, the node is a node of the property designated as the most authoritative property of the graph, and the most upstream node of the graph. Where a first property (e.g., property A) is upstream of a second property (e.g., property B), property A is closer to truth than property B. Accordingly, property A's downstream node is a parent of property B's downstream node, and property B's upstream node a parent of property A's upstream node. Thus, when property A's downstream node is triggered, property B is also triggered, and when property B pushes data upstream, property A will receive it.

In one embodiment, an electronic device comprises one or more processors having one or more processor core. The electronic device executes instructions stored in memory to provide an object property system. To provide the object property system, the processor receives a property lookup request including a root object and a property path and parses the property path to determine a property to associate with each section of the property path. For each section of the property path, the processor creates a proxy node and couples the proxy node with a graph node of the determined property. In one embodiment, the electronic device implements the graph as a directed acyclic graph of nodes.

In one embodiment, the processor of the electronic device executes instructions to establish and maintain a relationship between multiple properties of one or more objects managed by the object property system. The relationship can be constructed by creating a root proxy node for a root property to receive updates from the root property when the value of the root property changes. In one embodiment, the root property is defined as the base property in the property path that is provided when creating the property relationship. The root proxy node can then be coupled with the root property of the property path.

In one embodiment, a data processing system comprising a memory device and a processor is configured to implement the object property system, which includes a root object and a first property of the root object, which has a value defined at least in part by a path of nested properties including a second property, or via the second property via a complex relationship, such as a derived property or complex binding. The path of nested properties can be used to specify a dependency hierarchy for the property nesting in which the second property is based. The first property of the root object can access the value of the second property via at least one proxy node, which couples one or more of a downstream node and an upstream node of the respective properties, and automatically adjusts the node arrangements.

In one embodiment, a computer-implemented method is implemented at a proxy node of an object property system. The method can comprise receiving a notice at the proxy node of a change in a value of a property within the property path, automatically disconnecting the proxy node from an associated property in the property path in response to receiving the notice, and performing a property lookup to retrieve a set of graph nodes for a new property, wherein the set of retrieved graph nodes for the new property includes an upstream graph node and a downstream graph node. The method further includes coupling with the upstream node in the set of retrieved graph nodes when the proxy node is configured as an upstream proxy node, and coupling with the downstream node in the set of retrieved graph nodes when the proxy node is configured as a downstream node proxy node.

The above description does not include an exhaustive list of all aspects of the embodiments. It will be evident that various modifications and changes can be made thereto, and it will be apparent to those skilled in the art that many further modifications and adaptations can be made. It is contemplated that the embodiments include all systems, methods, and devices that can be practiced from all suitable combinations of the various aspects described above. Accordingly, the scope of the various embodiments is not to be determined by any specific example provided above but only by the claims below.

What is claimed is:

1. A computer implemented method at a proxy node of an object property system, the method comprising:
    receiving a notice at the proxy node of a change in a value of a property within a property path;
    automatically disconnecting the proxy node from an associated property in the property path in response to receiving the notice;
    performing a property lookup to retrieve a set of graph nodes for a new property, wherein the set of retrieved graph nodes for the new property includes an upstream graph node and a downstream graph node;
    when the proxy node is configured as an upstream proxy node, coupling with the upstream graph node in the set of retrieved graph nodes; and
    when the proxy node is configured as a downstream node proxy node, coupling with the downstream graph node in the set of retrieved graph nodes.

2. The method as in claim 1, wherein the notice of the change in the value of the property within the property path includes the value associated with the new property.

3. The method as in claim 1, further comprising propagating the notice of the change in the value to a dependent proxy node.

4. The method as in claim 3, wherein propagating the notice of the change in the value includes retrieving the value held by the new property and propagating the notice of the change in the value only if the value held by the new property differs from a previous value.

5. The method as in claim 1, additionally including:
    receiving a property lookup request including a root object and a property path;
    parsing the property path to determine the property to associate with each section of the property path; and
    for each section of the property path, creating the proxy node for the section of the property path and coupling the created proxy node with the graph node of the property associated with the section of the property path.

6. The method as in claim 5, wherein the graph node is within a directed acyclic graph of nodes associated with the properties of an object property system.

7. The method as in claim 6, additionally comprising:
    creating a root proxy node to receive a data update from a root property, wherein the root property is a base property of the property path;
    coupling the root proxy node to the root property of the property path,
    creating at least one terminal proxy node to receive a data update from a target property, wherein the target property is a terminal property referenced by the property path; and
    coupling the terminal proxy node to the target property of the property path, the terminal proxy node coupling to a downstream node of the target property in the property path.

8. The method as in claim 7, additionally comprising:
    creating an upstream proxy node for a property binding defined at least in part by the property path;
    coupling the upstream proxy node to an upstream node of the target property; and
    requesting change to a value of the target property for the property binding via the upstream proxy node for the property binding.

9. The method as in claim 8, additionally comprising coupling the upstream proxy node to the proxy node of a property from which the terminal property depends.

10. A non-transitory machine-readable storage medium storing instructions which, when executed by a data processing system, cause the system to perform operations comprising:
    receiving a notice at a proxy node of a change in a value of a property within a property path;
    automatically disconnecting the proxy node from an associated property in the property path in response to receiving the notice;
    performing a property lookup to retrieve a set of graph nodes for a new property, wherein the set of retrieved graph nodes for the new property includes an upstream graph node and a downstream graph node;
    when the proxy node is configured as an upstream proxy node, coupling with the upstream graph node in the set of retrieved graph nodes; and
    when the proxy node is configured as a downstream node proxy node, coupling with the downstream graph node in the set of retrieved graph nodes.

11. The non-transitory machine-readable storage medium as in claim 10, wherein the notice of the change in the value of the property within the property path includes the value associated with the new property.

12. The non-transitory machine-readable storage medium as in claim 11, the operations further comprising propagating the notice of the change in the value to a dependent proxy node.

13. The non-transitory machine-readable storage medium as in claim 12, wherein propagating the notice of the change in the value includes retrieving the value held by the new property and propagating the notice of the change in the value only if the value held by the new property differs from a previous value.

14. The non-transitory machine-readable storage medium as in claim 10, the operations additionally including:

receiving a property lookup request including a root object and a property path;

parsing the property path to determine the property to associate with each section of the property path; and for each section of the property path, creating the proxy node for the section of the property path and coupling the created proxy node with the graph node of the property associated with the section of the property path.

15. The non-transitory machine-readable storage medium as in claim 14, wherein the graph node is within a directed acyclic graph of nodes associated with the properties of an object property system.

16. The non-transitory machine-readable storage medium as in claim 15, the operations additionally including:

creating a root proxy node to receive a data update from a root property, wherein the root property is a base property of the property path;

coupling the root proxy node to the root property of the property path.

creating at least one terminal proxy node to receive a data update from a target property, wherein the target property is a terminal property referenced by the property path; and coupling the terminal proxy node to the target property of the property path, the terminal proxy node coupling to a downstream node of the target property in the property path.

17. The non-transitory machine-readable storage medium as in claim 16, the operations additionally including:

creating an upstream proxy node for a property binding defined at least in part by the property path;

coupling the upstream proxy node to an upstream node of the target property; and requesting change to a value of the target property for the property binding via the upstream proxy node for the property binding.

18. The non-transitory machine-readable storage medium as in claim 17, the operations additionally including coupling the upstream proxy node to the proxy node of a property from which the terminal property depends.

19. The non-transitory machine-readable storage medium as in claim 18, the operations additionally including providing an application framework including an object property system.

20. A data processing system comprising:

a memory device to store data and instructions; and one or more processors coupled to the memory device to execute instructions to provide an object property system to manage a data relationship between at least two properties via a directed acyclic graph including at least one node per property, the instructions to cause the one or more processors to perform operations including:

receiving a notice at a proxy node of a change in a value of a property within a property path;

automatically disconnecting the proxy node from an associated property in the property path in response to receiving the notice;

performing a property lookup to retrieve a set of graph nodes for a new property, wherein the set of retrieved graph nodes for the new property includes an upstream graph node and a downstream graph node;

when the proxy node is configured as an upstream proxy node, coupling with the upstream graph node in the set of retrieved graph nodes; and when the proxy node is configured as a downstream node proxy node, coupling with the downstream graph node in the set of retrieved graph nodes.

21. The data processing system as in claim 20, wherein the notice of the change in the value of the property within the property path includes the value associated with the new property.

22. The data processing system as in claim 21, the instructions to cause the one or more processors to perform further operations comprising propagating the notice of the change in the value to a dependent proxy node.

23. The data processing system as in claim 22, wherein propagating the notice of the change in the value includes retrieving the value held by the new property and propagating the notice of the change in the value only if the value held by the new property differs from a previous value.

24. The data processing system as in claim 20, the instructions to cause the one or more processors to perform additional operations including:

receiving a property lookup request including a root object and a property path;

parsing the property path to determine the property to associate with each section of the property path; and for each section of the property path, creating the proxy node for the section of the property path and coupling the created proxy node with the graph node of the property associated with the section of the property path.

25. The data processing system as in claim 20, wherein the graph node is within a directed acyclic graph of nodes associated with the properties of the object property system.

26. The data processing system as in claim 20, the instructions to cause the one or more processors to perform additional operations including:

creating a root proxy node to receive a data update from a root property, wherein the root property is a base property of the property path;

coupling the root proxy node to the root property of the property path.

creating at least one terminal proxy node to receive a data update from a target property, wherein the target property is a terminal property referenced by the property path; and coupling the terminal proxy node to the target property of the property path, the terminal proxy node coupling to a downstream node of the target property in the property path.

27. The data processing system as in claim 26, the instructions to cause the one or more processors to perform additional operations including:

creating an upstream proxy node for a property binding defined at least in part by the property path;

coupling the upstream proxy node to an upstream node of the target property; and requesting change to a value of the target property for the property binding via the upstream proxy node for the property binding.

28. The data processing system as in claim 27, the instructions to cause the one or more processors to perform additional operations including coupling the upstream proxy node to the proxy node of a property from which the terminal property depends.

29. The data processing system as in claim 20, the instructions to cause the one or more processors to perform additional operations including providing an application framework or a web-based application including the object property system.

* * * * *